United States Patent
Takahashi

(10) Patent No.: US 11,127,961 B2
(45) Date of Patent: Sep. 21, 2021

(54) INSPECTION METHOD FOR FUEL CELL STACK

(71) Applicant: TOYOTA JIDOSHA KABUSHIKI KAISHA, Toyota (JP)

(72) Inventor: Manabu Takahashi, Toyota (JP)

(73) Assignee: Toyota Jidosha Kabushishi Kaisha, Toyota (JP)

( * ) Notice: Subject to any disclaimer, the term of this patent is extended or adjusted under 35 U.S.C. 154(b) by 563 days.

(21) Appl. No.: 16/009,479

(22) Filed: Jun. 15, 2018

(65) Prior Publication Data

US 2018/0375119 A1 Dec. 27, 2018

(30) Foreign Application Priority Data

Jun. 21, 2017 (JP) .............................. JP2017-121099

(51) Int. Cl.
| | |
|---|---|
| *H01M 8/04492* | (2016.01) |
| *H01M 8/04302* | (2016.01) |
| *H01M 8/04303* | (2016.01) |
| *H01M 8/04537* | (2016.01) |
| *H01M 8/04701* | (2016.01) |
| *H01M 8/04746* | (2016.01) |
| *H01M 8/04291* | (2016.01) |
| *H01M 8/04828* | (2016.01) |
| *H01M 8/1018* | (2016.01) |

(52) U.S. Cl.
CPC ....... *H01M 8/045* (2013.01); *H01M 8/04291* (2013.01); *H01M 8/04302* (2016.02); *H01M 8/04303* (2016.02); *H01M 8/04552* (2013.01); *H01M 8/04701* (2013.01); *H01M 8/04731* (2013.01); *H01M 8/04753* (2013.01); *H01M 8/04835* (2013.01); *H01M 2008/1095* (2013.01)

(58) Field of Classification Search
None
See application file for complete search history.

(56) References Cited

U.S. PATENT DOCUMENTS

2013/0130140 A1* 5/2013 Kato .................... H01M 8/242
429/429

FOREIGN PATENT DOCUMENTS

| JP | 2007-149443 A | 6/2007 |
| JP | 2012-18854 | 1/2012 |
| JP | 2014-165063 A | 9/2014 |
| JP | 2014-197481 | 10/2014 |
| JP | 2016-085898 A | 5/2016 |

* cited by examiner

*Primary Examiner* — Zhongqing Wei
(74) *Attorney, Agent, or Firm* — Finnegan, Henderson, Farabow, Garrett & Dunner, LLP

(57) ABSTRACT

The inspection method for a fuel cell stack including a plurality of unit cells comprises: (a) operating a fuel cell system, including the fuel cell stack and an anode gas circulation flow path that is connected between an anode gas discharge port and an anode gas supply port of the fuel cell stack to circulate anode gas, under a predetermined liquid water accumulation condition to accumulate liquid water in the anode gas circulation flow path; (b) causing, after the step (a), the fuel cell system to stop and stand by until a predetermined restarting condition is satisfied; and (c) restarting, after the step (b), the fuel cell system to implement power generation by the fuel cell stack, and measuring voltage of each of the unit cells to detect a unit cell having negative voltage.

5 Claims, 6 Drawing Sheets

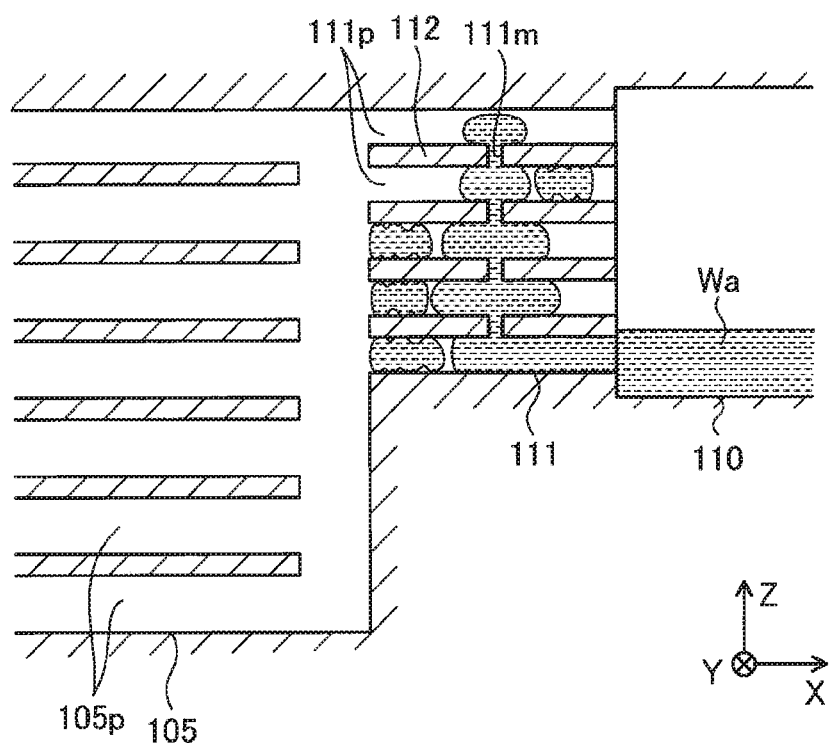

INSPECTION METHOD FOR FUEL CELL STACK

CROSS REFERENCE TO RELATED APPLICATIONS

The present application claims priority to Japanese Patent Application No. 2017-121099 filed on Jun. 21, 2017, the contents of which are incorporated herein by reference.

BACKGROUND

Field

The present disclosure relates to a method for detecting a unit cell whose anode gas introducing flow path is likely to be clogged by liquid water, in a plurality of unit cells in a fuel cell stack.

Related Art

An anode gas flow path for a unit cell in a fuel cell stack might be clogged by liquid water produced by power generation. A scavenging operation is performed to prevent the anode gas flow path from being clogged by the liquid water when a fuel cell system is to be stopped. A fuel cell system disclosed in JP2014-197481A performs the scavenging operating with anode gas serving as scavenging gas, to discharge liquid water staying in an anode exhaust gas exiting flow path to the outside of the unit cell. Thus, the anode exhaust gas exiting flow path is prevented from clogging.

The present inventors have found out that there might be a unit cell that is likely to involve clogging by liquid water, due to an excessively small diameter of an anode gas flow path attributable to a manufacturing error. The clogging by the liquid water is particularly likely to occur in a structure with a locally small anode gas flow path, such as an anode gas introducing flow path employing a comb-shaped flow path structure. When the anode gas introducing flow path is clogged, a unit cell falls short of anode gas to have negative voltage. Thus, the unit cell might be deteriorated. Unfortunately, whether the clogging by the liquid water occurs is difficult to determine with the unit cells individually inspected before the fuel cell stack is assembled because the locally small anode gas flow path has an extremely small size. Thus, an inspection for a fuel cell stack enabling detection of a unit cell whose anode gas introducing flow path is likely to be clogged is desired.

SUMMARY

The present disclosure is made to solve the problems described above, and can be implemented as the following aspects.

(1) According to an aspect of the present disclosure, there is provided an inspection method for a fuel cell stack including a plurality of unit cells. The inspection method comprises: (a) operating a fuel cell system, including the fuel cell stack and an anode gas circulation flow path that is connected between an anode gas discharge port and an anode gas supply port of the fuel cell stack to circulate anode gas, under a predetermined liquid water accumulation condition to accumulate liquid water in the anode gas circulation flow path; (b) causing, after the step (a), the fuel cell system to stop and stand by until a predetermined restarting condition is satisfied; and (c) restarting, after the step (b), the fuel cell system to implement power generation by the fuel cell stack, and measuring voltage of each of the unit cells to detect a unit cell having negative voltage.

With the inspection method for a fuel cell stack according to this aspect, the liquid water is accumulated in the anode gas circulation flow path due to the operation under the liquid water accumulation condition. Thus, the liquid water in the anode gas circulation flow path flows into an anode gas introducing flow path of each of the unit cells at the time of restarting. A unit cell having an excessively small anode gas introducing flow path will be clogged by the liquid water. Thus, such a unit cell falls short of the anode gas, as the power generation continues, to have negative voltage. By detecting a unit cell having the negative voltage, it is possible to detect a unit cell whose anode gas introducing flow path is likely to be clogged. During the stand by state after the operation under the liquid water accumulation condition, produced water in each unit cell moves from a cathode side to an anode side. Thus, a spatial volume of the anode gas in the unit cell decreases, and the remaining amount of the anode gas decreases. With this configuration, the unit cell is likely to fall short of the anode gas after the restarting. This facilitates the detection of the negative voltage, whereby a unit cell whose anode gas introducing flow path is likely to be clogged will be easily detected.

(2) According to another aspect, the operation under the liquid water accumulation condition in the step (a) may include: a low load operation in which the fuel cell system is operated with the fuel cell stack generating an electric current lower than a rated current of the fuel cell stack; and a non-power-generating operation, performed after the low load operation, in which the power generation by the fuel cell stack is stopped and the fuel cell system operates with circulation of the anode gas continuing in the anode gas circulation flow path.

With the inspection method for a fuel cell stack according to this aspect, reactive gas flows at a low flowrate due to the low load operation, whereby the produced water in the unit cells is less likely to be taken away. Thus, a large amount of liquid water will stay in the unit cells. Furthermore, condensation occurs in the anode gas circulation flow path due to the non-power-generating operation, whereby the liquid water will be accumulated in the anode gas circulation flow path.

(3) According to still another aspect, the low load operation may be performed in such a manner that a temperature of the fuel cell stack rises to a predetermined warm-up completed temperature due to the low load operation while a temperature of an anode gas circulation pump provided on the anode gas circulation flow path does not reach the warm-up completed temperature.

With the inspection method for a fuel cell stack according to this aspect, the temperature of the anode exhaust gas sufficiently rises while that of the anode gas circulation pump does not rise as much. This results in a temperature difference leading to the condensation in the anode gas circulation pump, thereby accumulating a large amount of liquid water.

(4) According to still another aspect, the restarting condition may include at least either one of a condition satisfied when a predetermined stand by time period elapses after the fuel cell system has stopped, and a condition satisfied when the temperature of the fuel cell stack drops to a predetermined stand by completion temperature.

With the inspection method for a fuel cell stack according to this aspect, water will sufficiently move from the cathode side to the anode side of the unit cell, whereby a shorter inspection time period will be achieved.

(5) According to still another aspect, the step (a) may be executed to accumulate liquid water in an anode gas circulation pump provided on the anode gas circulation flow path.

With the inspection method for a fuel cell stack according to this aspect, the liquid water will accumulate in the anode gas circulation pump, whereby the liquid water in the anode gas circulation pump will be supplied to the fuel cell stack together with the anode gas, when the fuel cell system is restarted.

(6) According to still another aspect, the step (c) may include supplying anode gas to the fuel cell stack, before the power generation by the fuel cell stack begins, to replace gas remaining on an anode side of the unit cells with the anode gas.

With the inspection method for a fuel cell stack according to this aspect, the anode gas replacing step causes the liquid water in the anode gas circulation flow path to flow into the anode gas introducing flow path of each unit cell.

The present disclosure may be implemented in various aspects other than those described above. For example, the present disclosure may be implemented as an inspection apparatus for a fuel cell stack.

BRIEF DESCRIPTION OF THE DRAWINGS

FIG. 6 is a diagram illustrating an example how an anode gas introducing flow path is clogged by liquid water.

DESCRIPTION OF THE PREFERRED EMBODIMENTS

Figure 1:
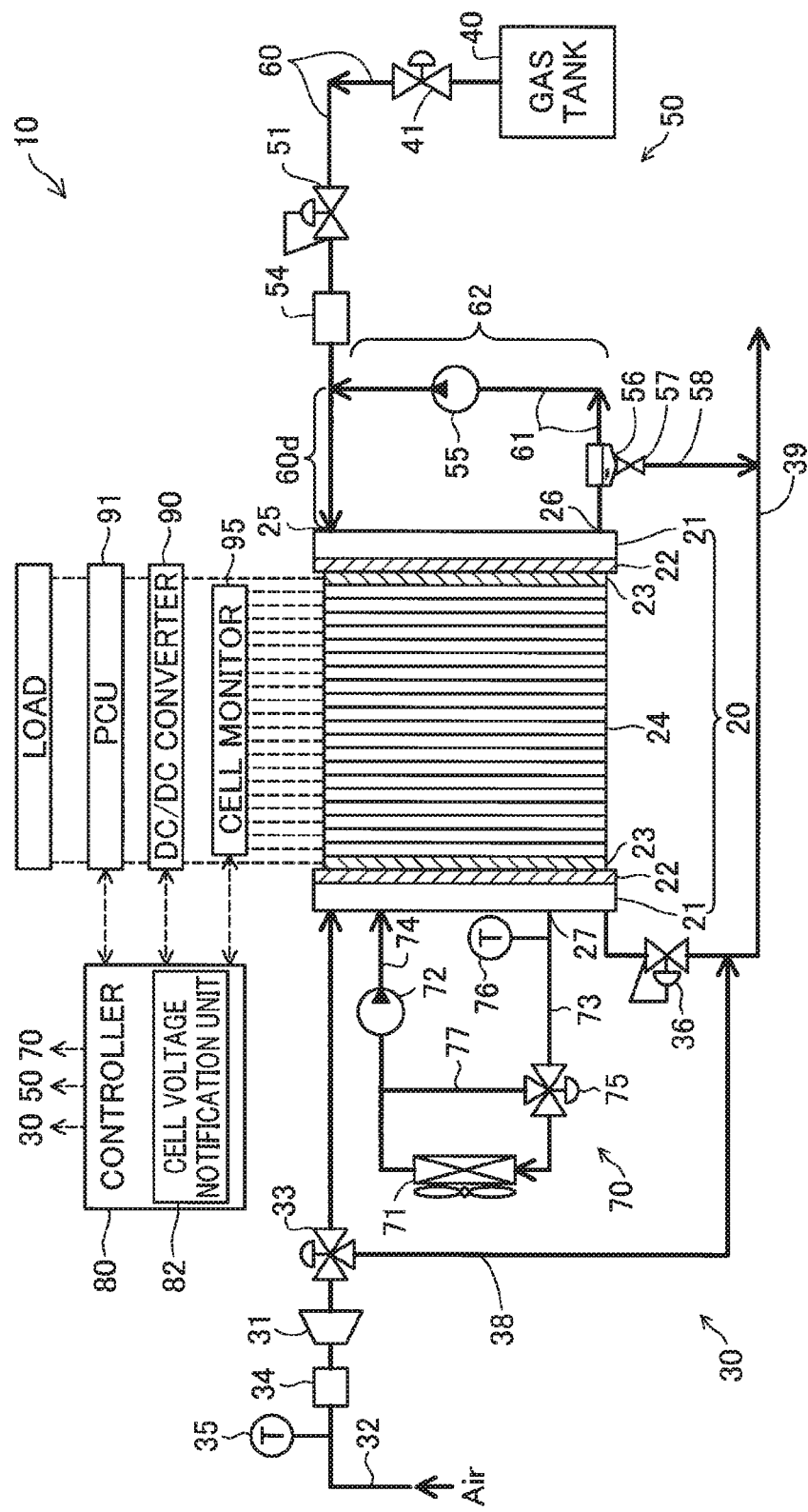
FIG. 1 is a diagram illustrating a schematic configuration of a fuel cell system according to one embodiment of the present disclosure.

FIG. 1 is a diagram illustrating a schematic configuration of a fuel cell system 10 provided with a fuel cell stack 20 that is an inspection target according to one embodiment of the present disclosure. In the present embodiment, the fuel cell stack 20 is inspected while the operation of a fuel cell system is replicated as is actually done when installed in a vehicle to output power to serve as a power source for the vehicle. The fuel cell system 10 has a configuration similar to that of an on-vehicle fuel cell system. The fuel cell system 10 includes the fuel cell stack 20, an anode gas supplying circulation system 50, a cathode gas supplying/discharging system 30, a coolant circulation system 70, a controller 80, a DC/DC converter 90, a power control unit (hereinafter, referred to as "PCU") 91, and a cell monitor 95.

The fuel cell stack 20 includes an end plate 21, an insulating plate 22, a collector plate 23, a plurality of unit cells 24, a collector plate 23, an insulating plate 22, and an end plate 21 that are stacked in this order. The unit cells 24 each include a membrane electrode assembly (not illustrated) and two separators that sandwich the membrane electrode assembly from both anode and cathode sides.

The anode gas supplying circulation system 50 is controlled by the controller 80 to supply anode gas to the fuel cell stack 20 and circulate the anode gas. In the example illustrated in FIG. 1, hydrogen is used as the anode gas. The anode gas supplying circulation system 50 includes a gas tank 40, a shutoff valve 41, an anode gas supply pipe 60, a regulator 51, an injector 54, an anode gas return pipe 61, an anode gas circulation pump 55, a gas-liquid separator 56, a shutoff valve 57, and a gas/liquid discharge pipe 58.

The gas tank 40 stores therein hydrogen gas under high pressure such as several tens of MPa. The anode gas supply pipe 60 is connected between the gas tank 40 and an anode gas supply port 25 of the fuel cell stack 20, for supplying hydrogen from the gas tank 40 to the fuel cell stack 20. The shutoff valve 41, the regulator 51, and the injector 54 are provided on the anode gas supply pipe 60 in this order from a side closer to the gas tank 40. The regulator 51 adjusts the pressure of hydrogen. The injector 54 injects hydrogen, with the pressure adjusted by the regulator 51, to the anode gas supply port 25 of the fuel cell stack 20.

The anode gas return pipe 61, through which the anode gas returns, is connected to an anode gas discharge port 26 of the fuel cell stack 20 and a downstream portion 60*d* of the anode gas supply pipe 60. The gas-liquid separator 56 and the anode gas circulation pump 55 are provided on the anode gas return pipe 61 in this order from a side closer to the anode gas discharge port 26 of the fuel cell stack 20. The gas-liquid separator 56 separates gas and liquid, discharged from the anode gas discharge port 26 of the fuel cell stack 20. The gas discharged from the anode gas discharge port 26 mainly includes hydrogen that has not contributed to power generation, nitrogen that has passed through the unit cells 24 from a cathode side to an anode side, and water vapor produced by the power generation. The liquid discharged from the anode gas discharge port 26 mainly includes liquid water produced by the power generation. The gas-liquid separator 56 separates nitrogen and liquid water, among these, and discharges the nitrogen and the liquid water to the outside through the shutoff valve 57 and the gas/liquid discharge pipe 58. Hydrogen and water vapor, remaining in the gas-liquid separator 56, are returned to the anode gas return pipe 61 as the anode gas by the anode gas circulation pump 55, to be supplied to the fuel cell stack 20 again through the downstream portion 60*d* of the anode gas supply pipe 60. The anode gas return pipe 61, the downstream portion 60*d* of the anode gas supply pipe 60, the gas-liquid separator 56, and the anode gas circulation pump 55 form an anode gas circulation flow path 62 that is connected between the anode gas discharge port 26 and the anode gas supply port 25 of the fuel cell stack 20, and circulates the anode gas.

The cathode gas supplying/discharging system 30 is controlled by the controller 80 to supply and discharge cathode gas to and from the fuel cell stack 20. In the example illustrated in FIG. 1, air is used as the cathode gas. The cathode gas supplying/discharging system 30 includes a cathode gas supply pipe 32, a compressor 31, a three-way valve 33, a bypass pipe 38, a pressure regulating valve 36, and a cathode gas discharge pipe 39.

The cathode gas supply pipe 32 is connected to the fuel cell stack 20, and supplies the air, taken in from the outside, to the fuel cell stack 20. An outer temperature sensor 35, an air flow meter 34, the compressor 31, and the three-way valve 33 are provided on the cathode gas supply pipe 32 in this order from an air inlet side. The outer temperature sensor 35 measures the temperature of the air to be taken in.

The air flow meter 34 measures an amount of air that has been taken in. The compressor 31 compresses the air that has been taken in. The three-way valve 33 is connected to the bypass pipe 38 and adjusts a flowrate of the air to the fuel cell stack 20 and the bypass pipe 38. The bypass pipe 38 is connected to the cathode gas discharge pipe 39.

The cathode gas discharge pipe 39 has an upstream side end portion connected to the fuel cell stack 20 and has an intermediate portion connected to the bypass pipe 38 and to the gas/liquid discharge pipe 58 of the anode gas supplying circulation system 50. The cathode gas discharge pipe 39 discharges cathode exhaust gas discharged from the fuel cell stack 20, part of the air branched to be sent to the bypass pipe 38, and nitrogen and liquid water discharged from the gas/liquid discharge pipe 58, to the outside. The cathode gas discharge pipe 39 is provided with the pressure regulating valve 36. The pressure regulating valve 36 is positioned closer to the fuel cell stack 20 than a portion where the cathode gas discharge pipe 39 and the bypass pipe 38 are connected to each other is. The pressure regulating valve 36 adjusts the pressure of air supplied to the fuel cell stack 20.

The coolant circulation system 70 is controlled by the controller 80 to cool the fuel cell stack 20. The coolant circulation system 70 includes a coolant supply pipe 74, a coolant discharge pipe 73, a radiator 71, a bypass pipe 77, a three-way valve 75, and a coolant pump 72. Examples of the coolant to be used include water, nonfreezing water such as ethylene glycol, and air. The coolant pump 72 is provided to the coolant supply pipe 74, and supplies the coolant to the fuel cell stack 20. The three-way valve 75 adjusts the flowrate of the coolant to the radiator 71 and the bypass pipe 77. The coolant discharge pipe 73 close to a coolant outlet 27 of the fuel cell stack 20 is provided with a coolant outlet temperature sensor 76. The coolant outlet temperature sensor 76 measures the temperature of the coolant flowing through the coolant outlet 27 of the fuel cell stack 20 to measure the temperature of the fuel cell stack 20, while the fuel cell system 10 is operating. When the fuel cell system 10 is not operating, the coolant does not circulate. Thus, the temperature of the fuel cell stack 20 is estimated based on a measurement value obtained by the coolant outlet temperature sensor 76 and a measurement value obtained by the outer temperature sensor 35 or an outer temperature sensor (not illustrated) for an in-vehicle air conditioner. Such relationship regarding temperature is stored in a nonvolatile memory (not illustrated) in the controller 80 as a map or a lookup table.

The controller 80 is formed as a computer including a central processing unit (CPU) and the nonvolatile memory, and is specifically an Electronic Control Unit (ECU). The controller 80 outputs a signal for controlling starting and stopping of the fuel cell system 10. Upon receiving a power generation request, the controller 80 controls the components of the fuel cell system 10 to cause the fuel cell stack 20 to generate power. The controller 80 controls the cell monitor 95 to measure cell voltage of each of the unit cells 24 in the fuel cell stack 20. A value of the cell voltage of each of the unit cells 24 measured by the cell monitor 95 is transmitted to a cell voltage notification unit 82 of the controller 80 to be issued as a notification to the outside.

The DC/DC converter 90 is controlled by the controller 80 to raise voltage output from the fuel cell stack 20, and supply the resultant voltage to the PCU 91. The PCU 91 incorporates an inverter, and is controlled by the controller 80 to supply power to a load. During an inspection for the fuel cell stack 20 described later, the PCU 91 is controlled by the controller 80 to adjust current generated by the fuel cell stack 20.

Figure 2:
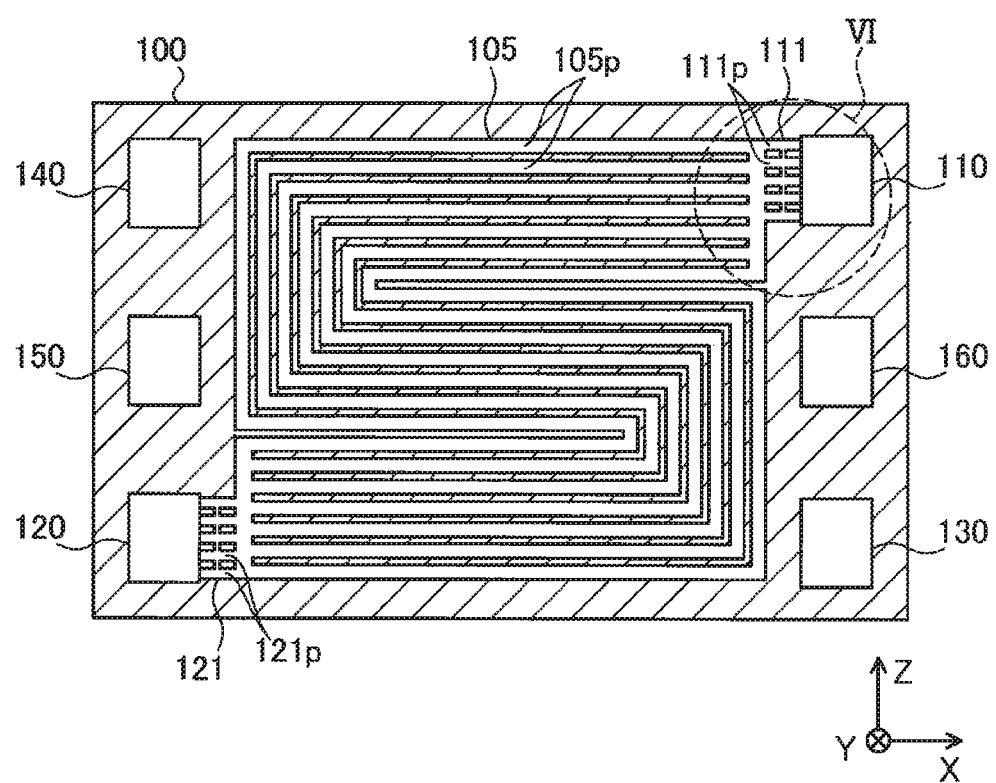
FIG. 2 is a diagram illustrating an exemplary schematic configuration of an anode side separator of unit cells.

FIG. 2 is a diagram illustrating a schematic configuration of an anode side separator 100 of the unit cell 24 in the fuel cell stack 20 (FIG. 1) as viewed from a membrane electrode assembly side. In FIG. 2, an X direction is a horizontal direction, a Z direction is a vertically upward direction, and a Y direction is a stacking direction of the unit cells 24. The separator 100 has one end portion in a longitudinal direction provided with an anode gas inlet manifold hole 110, a coolant outlet manifold hole 160, and a cathode gas inlet manifold hole 130 that are arranged in this order from the upward side to the downward side. The separator 100 has the other end portion provided with a cathode gas outlet manifold hole 140, a coolant inlet manifold hole 150, and an anode gas outlet manifold hole 120 that are arranged in this order from the upward side to the downward side. The anode gas inlet manifold hole 110 and the anode gas outlet manifold hole 120 are respectively in communication with the anode gas supply port 25 and the anode gas discharge port 26 of the fuel cell stack 20 illustrated in FIG. 1.

The separator 100 has a center portion in which an anode gas flow path 105 in a form of a plurality of streaks is formed. In the example illustrated in FIG. 2, the anode gas flow path 105 is a serpentine flow path in which a plurality of unit flow paths 105$p$, in a form of grooves arranged at an equal interval, are formed in a meandering manner. An anode gas introducing flow path 111 is formed between the anode gas flow path 105 and the anode gas inlet manifold hole 110. An anode gas exiting flow path 121 is formed between the anode gas flow path 105 and the anode gas outlet manifold hole 120. The anode gas introducing flow path 111 includes a plurality of unit introducing flow paths 111$p$ in a form of grooves arranged at an equal interval along the Z direction, to have a comb shape. Similarly, the anode gas exiting flow path 121 includes a plurality of unit exiting flow paths 121$p$ in a form of grooves arranged at an equal interval along the Z direction, to have a comb shape. Note that the anode gas introducing flow path 111 and the anode gas exiting flow path 121 do not need to have the comb shape.

The hydrogen supplied to the anode gas inlet manifold hole 110 passes through the anode gas introducing flow path 111 to flow into the anode gas flow path 105. The hydrogen that has flowed into the anode gas flow path 105 flows in a meandering manner, and goes through the anode gas exiting flow path 121 to reach the anode gas outlet manifold hole 120.

Figure 3:
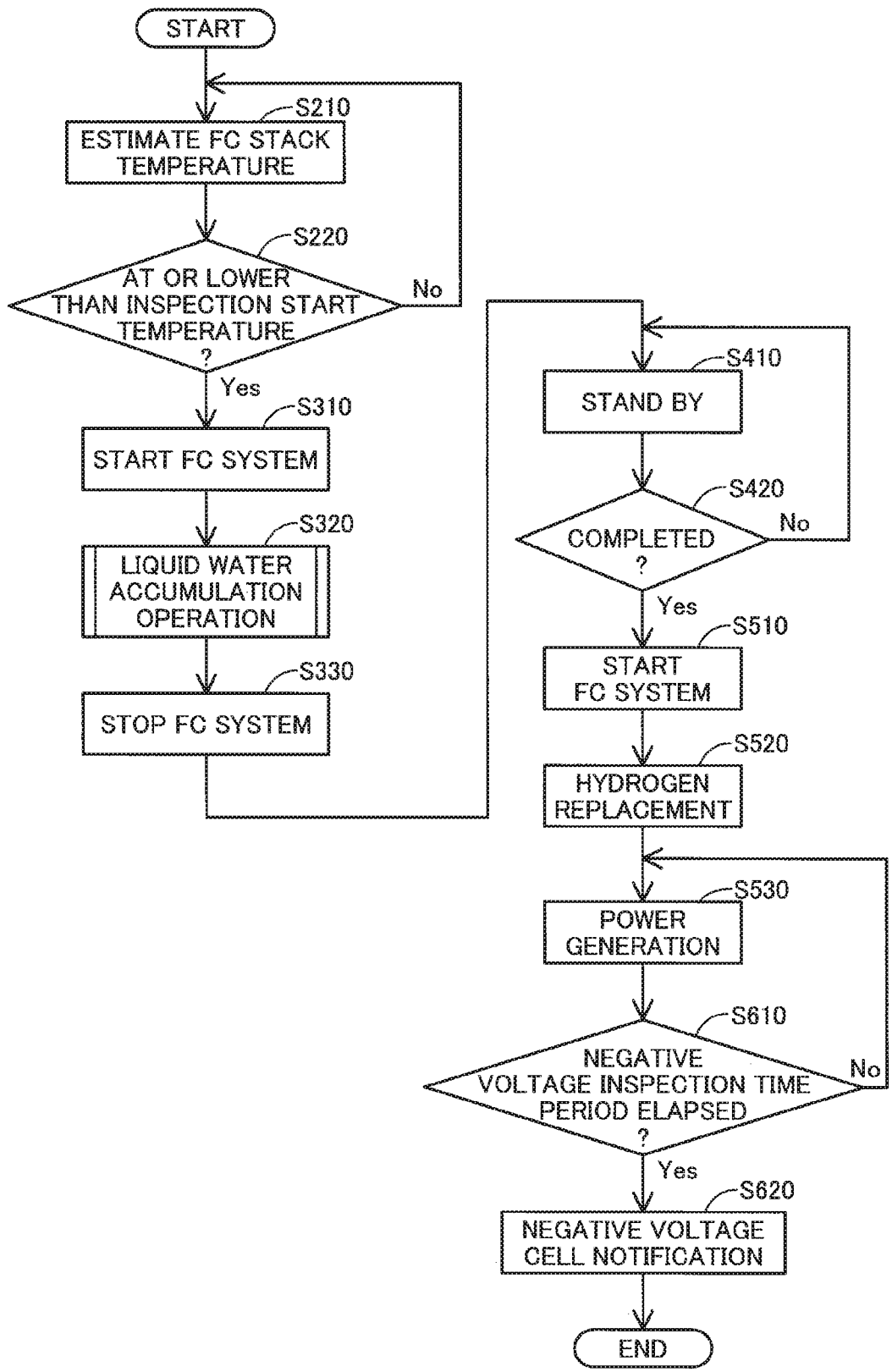
FIG. 3 is a flowchart illustrating an inspection method for a fuel cell stack.

FIG. 3 is a flowchart illustrating an inspection method for a fuel cell stack according to one embodiment of the present disclosure. This flow starts in a state where the entire fuel cell system 10 has been stopped with the fuel cell stack 20, which is an inspection target, installed as illustrated in FIG. 1. In step S210, the controller 80 uses the temperature measurement values, obtained by the coolant outlet temperature sensor 76 (FIG. 1) and the outer temperature sensor 35 (FIG. 1), to estimate the temperature of the fuel cell stack 20.

In step S220, the controller 80 determines whether the temperature of the fuel cell stack 20, estimated in step S210, has dropped to or below an inspection start temperature. The inspection start temperature is a temperature at which the fuel cell stack 20 can be regarded as having a sufficiently low temperature; it may be set between 20° C. and 40° C., inclusive, for example. When the temperature of the fuel cell stack 20 before being started has dropped to or below the inspection start temperature, the liquid water will be easily accumulated in a liquid water accumulation operation in step S320 described later. When the fuel cell stack 20 has dropped to or below the inspection start temperature, other components (the anode gas circulation pump 55 for example) of the fuel cell system 10 is expected to have the temperature at or lower than the inspection start temperature. Still the determination condition in step S220 may further include a condition satisfied when the temperature of the anode gas circulation pump 55 has dropped to or below the inspection start temperature. When the temperature of the fuel cell stack 20 is determined to have not dropped to or below the inspection start temperature in step S220, the processing returns to step S210 and the temperature estimation continues. When the temperature of the fuel cell stack 20 is determined to have dropped to or below the inspection start temperature in step S220, the processing proceeds to step S310. Note that steps S210 and S220 may be omitted.

In step S310, the controller 80 starts the fuel cell system 10. In step S320, the controller 80 operates the fuel cell system 10 under a liquid water accumulation condition, so that the liquid water accumulates in the anode gas circulation flow path 62 (FIG. 1).

Figure 4:
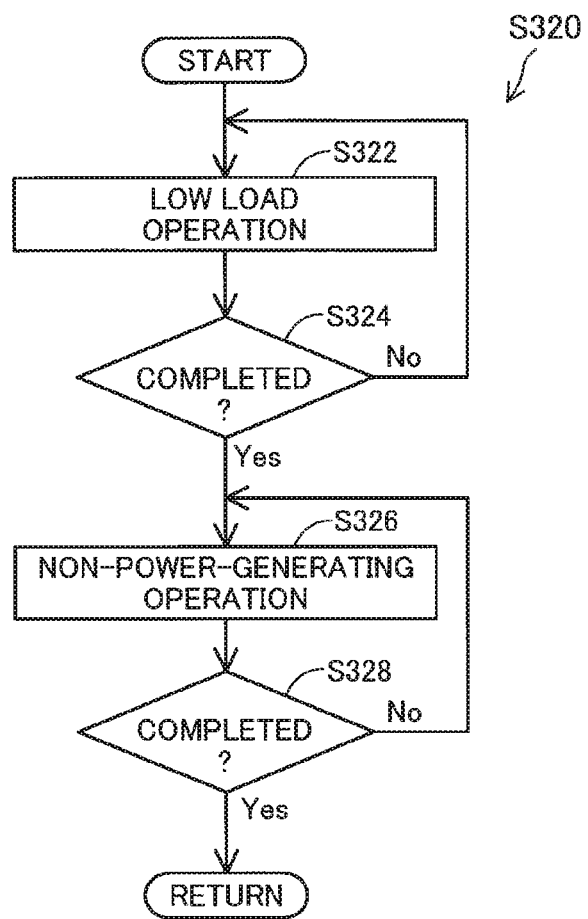
FIG. 4 is a flowchart illustrating an example of a liquid water accumulation operation.

FIG. 4 is a flowchart illustrating an example of the liquid water accumulation operation in step S320 illustrated in FIG. 3. In step S322, the controller 80 executes a low load operation. The "low load operation" denotes an operation of the fuel cell system 10 where the fuel cell stack 20 generates an electric current which is lower than the rated current of the fuel cell stack 20. For example, an electric current between 2% and 15%, inclusive, of the rated current of the fuel cell stack 20 is preferably generated in the low load operation. The fuel cell stack 20 that has started thus operating under a low load results in a low flowrate of the anode gas and the cathode gas due to the low load, thereby preventing produced water in the unit cell 24 from being taken out, and causing a large amount of produced water to stay in the unit cell 24. The low load operation also serves as a warm-up operation for raising the temperature of the fuel cell stack 20. Specifically, the anode gas temperature gradually rises during the low load operation. As will be described later, the low load operation preferably ends before the temperature in the anode gas circulation flow path 62 (the anode gas circulation pump 55 in particular) substantially rises. Preferably, the anode gas supplying circulation system 50 and the cathode gas supplying/discharging system 30 operate during the low load operation in such a manner that a stoichiometric ratio of each of the anode gas and the cathode gas is set to be a value within an appropriate range (for example, between 1.20 and 1.30, inclusive). This "stoichiometric ratio" is a ratio of an actual reactive gas flowrate to a reactive gas flowrate theoretically required for power generation.

In step S324, the controller 80 determines whether the low load operation has been completed. A low load operation completion condition may be satisfied when the temperature of the fuel cell stack 20 reaches a predetermined warm-up completed temperature, for example. For example, the warm-up completed temperature is set between 55° C. and 60° C., inclusive. Preferably, when the low load operation is completed, the temperature of the fuel cell stack 20 reaches the warm-up completed temperature while that of the anode gas circulation pump 55 does not. As a result, condensation occurs in the anode gas circulation pump 55 due to a temperature difference between the anode gas exhaust gas and the anode gas circulation pump 55, thereby accumulating a large amount of liquid water. When the low load operation is determined to have not been completed, the processing returns to step S322, and the low load operation continues. When the low load operation is determined to have been completed, the processing proceeds to step S326.

In step S326, the controller 80 executes a non-power-generating operation. The "non-power-generating operation" denotes an operation of the fuel cell system 10 where the power generation by the fuel cell stack 20 is stopped while the anode gas is continued to be circulated in the anode gas circulation flow path 62. For example, when the non-power-generating operation is performed, the hydrogen supply from the injector 54 is stopped, but the anode gas circulation pump 55 continues to be operated so that the anode gas circulates. The non-power-generating operation may be performed as an "intermittent operation". The "intermittent operation" denotes an operation where the power generation by the fuel cell stack 20 is temporarily stopped while the fuel cell system 10 keeps operating. During the intermittent operation or the non-power-generating operation, the fuel cell stack 20 may generate small current so that the voltage of the unit cell 24 is prevented from becoming an open circuit voltage. Such an operation involves substantially no power generation and thus may also be regarded as the "intermittent operation" or the "non-power-generating operation". During the non-power-generating operation, the cathode gas supply may be continued or stopped.

If the temperature in the fuel cell stack 20 or the anode gas circulation flow path 62 has dropped to a sufficiently low temperature before the low load operation in step S322 starts, the temperature of the anode gas circulation flow path 62, including the anode gas circulation pump 55 and the gas-liquid separator 56, does not reach the warm-up completed temperature when the temperature of the fuel cell stack 20 reaches the warm-up completed temperature due to the low load operation. Thus, when highly humid anode gas, discharged from the fuel cell stack 20, passes through the anode gas circulation flow path 62, condensation occurs in the anode gas circulation flow path 62, thereby accumulating liquid water therein. Especially, the anode gas circulation pump 55 and the gas-liquid separator 56 are likely to be maintained at a low temperature than pipes, whereby the liquid water accumulation is facilitated in such components.

In step S328, the controller 80 determines whether the non-power-generating operation has been completed. For example, a non-power-generating operation completion condition may be satisfied when a period of time for accumulating a sufficient amount of liquid water in the anode gas circulation flow path 62 elapses. For example, the period of time for accumulating a sufficient amount of liquid water is set between three minutes and seven minutes, inclusive. When the non-power-generating operation is determined to have not been completed yet, the processing returns to step S326, and the non-power-generating operation continues. When the non-power-generating operation is determined to have been completed, the processing in FIG. 4 is completed, and the processing in FIG. 3 proceeds to step S330.

In place of the low load operation and the non-power-generating operation under the above liquid water accumulation condition, another operation under other liquid water accumulation conditions may be performed. For example, the liquid water accumulation operation may be performed with the fuel cell system performing the warm-up operation while the outer temperature is lowered to be lower than the freezing temperature. In the operation, it is possible to accumulate a larger amount of liquid water by lowing the temperature of the anode gas supplied to the fuel cell stack to be lower than the freezing temperature. Under any of the liquid water accumulation conditions, the temperature of the anode gas circulation pump 55 is preferably lower than the temperature of the fuel cell stack 20 by a predetermined temperature difference (for example, 10° C.) or more, at the point when the operation under the liquid water accumulation condition ends. This ensures a large amount of liquid water accumulated in the anode gas circulation flow path 62 including the anode gas circulation pump 55.

Referring back to FIG. 3, after the liquid water accumulation operation in step S320, the controller 80 stops the operation of the fuel cell system 10 in step S330. In step S410, the controller 80 causes the fuel cell system 10 to stand by until a restarting condition is satisfied. At the timing of step S410, all of the anode gas supplying circulation system 50, the cathode gas supplying/discharging system 30, and the coolant circulation system 70 have stopped operating. The stand by state in this stopped state results in the produced water in the unit cells 24, produced during the low load operation in step S322 (FIG. 4), moving from the cathode side to the anode side through the membrane electrode assembly. Thus, the spatial volume of the hydrogen in the unit cell 24 decreases, and the remaining amount of hydrogen decreases. Thus, the unit cell 24 is likely to fall short of hydrogen during the power generation described later, so that negative voltage will be easily detected.

During the stand by state, if the coolant circulation system 70 operates to forcibly cool the fuel cell stack 20, the produced water is more likely to stay close to the cathode side separator. This results in a smaller amount of water moving to the anode side. The produced water on the cathode side is discharged to the outside of the unit cell 24 together with the cathode exhaust gas, when the fuel cell system 10 is restarted. Thus, the system preferably stands by with the coolant circulation system 70 stopped so that an amount of water will be increased on the anode side. During the stand by state, nitrogen in the air on the cathode side also moves to the anode side through the membrane electrode assembly, and hydrogen on the anode side moves to the cathode side through the membrane electrode assembly to react with the air on the cathode side.

In step S420, the controller 80 determines whether the stand by of the fuel cell system 10 has been completed. For example, a stand by completion condition (or a restarting condition) may be set to include at least either one of: a condition satisfied when a predetermined stand by time period elapses after the fuel cell system 10 has stopped, and a condition satisfied when the temperature of the fuel cell stack 20 drops to a predetermined stand by completion temperature. The "stand by time period" is a time period long enough for the produced water to sufficiently move from the cathode side to the anode side, and is set between an hour and three hours, inclusive, for example. The "stand by completion temperature" is a temperature at which the water vapor in the produced water sufficiently turns into liquid water, and is set between 30° C. and 40° C., inclusive, for example. With the restarting condition thus set, a shorter inspection time period will be achieved with water sufficiently moved from the cathode side to the anode side of the unit cell 24. When the stand by state is determined to have not been completed yet (the restarting condition not satisfied) in step S420, the processing returns to step S410, and the stand by state continues. When the stand by state is determined to have been completed (the restarting condition is satisfied), the processing proceeds to step S510.

In step S510, the controller 80 restarts the fuel cell system 10. In step S520, the controller 80 executes a process of supplying anode gas to the fuel cell stack 20, before the power generation by the fuel cell stack 20 begins, to replace gas remaining on the anode side of the unit cells 24 with the anode gas. Specifically, the controller 80 operates the injector 54 and the anode gas circulation pump 55 to introduce hydrogen into the fuel cell stack 20, to replace nitrogen and a small amount of hydrogen, staying on the anode side of the unit cell 24 in the stand by process in step S410, with new hydrogen. When the anode gas circulation pump 55 starts operating, the liquid water accumulated in the anode gas circulation flow path 62, due to the liquid water accumulation operation in step S320, is supplied to the anode gas supply port 25 (FIG. 1) of the fuel cell stack 20. The liquid water supplied to the anode gas supply port 25 flows into the anode gas introducing flow path 111 (FIG. 2) of the unit cells 24. Thus, a unit cell 24 whose unit introducing flow path 111p has an excessively small cross-sectional flow area, due to a manufacturing error, is clogged by the liquid water. Note that step S520 can be omitted.

In step S530, the controller 80 causes the fuel cell stack 20 to generate power. The power generation is preferably performed with the fuel cell stack 20 generating small current to prevent the voltage of the unit cell 24 from becoming the open circuit voltage. For example, the power generation is performed with the current between 3% and 15%, inclusive, of the rated current of the fuel cell stack 20. As the fuel cell stack 20 continues to generate power, the hydrogen within the unit cell 24 is consumed. As a result, the unit cell 24, with the anode gas introducing flow path 111 clogged, has negative voltage due to hydrogen shortage. During the power generation, the controller 80 causes the cell monitor 95 (FIG. 1) to measure the cell voltage of each of the unit cells 24 to detect the unit cell having the negative voltage. The controller 80 is notified of a result of the measurement. The cell voltage of the unit cell 24 may be measured after the power generation in step S530 has been completed.

In step S610, the controller 80 determines whether a negative voltage inspection time period has elapsed. For example, the negative voltage inspection time period is set between 3 seconds and 10 seconds, inclusive. When the negative voltage inspection time period is determined to have not elapsed yet, the processing returns to step S530, and the power generation continues. When the negative voltage inspection time period is determined to have elapsed, the processing proceeds to step S620. In step S620, the cell voltage notification unit 82 of the controller 80 issues a notification indicating the unit cell having a negative voltage to an inspector staff. For example, the notification preferably includes a position of the unit cell 24 in the fuel cell stack 20 (cell number) and a value of the negative voltage. When the unit cell having a negative voltage is detected, a process such as disassembling the fuel cell stack 20 and replacing the unit cell with a new cell is performed, for example.

Figure 5:
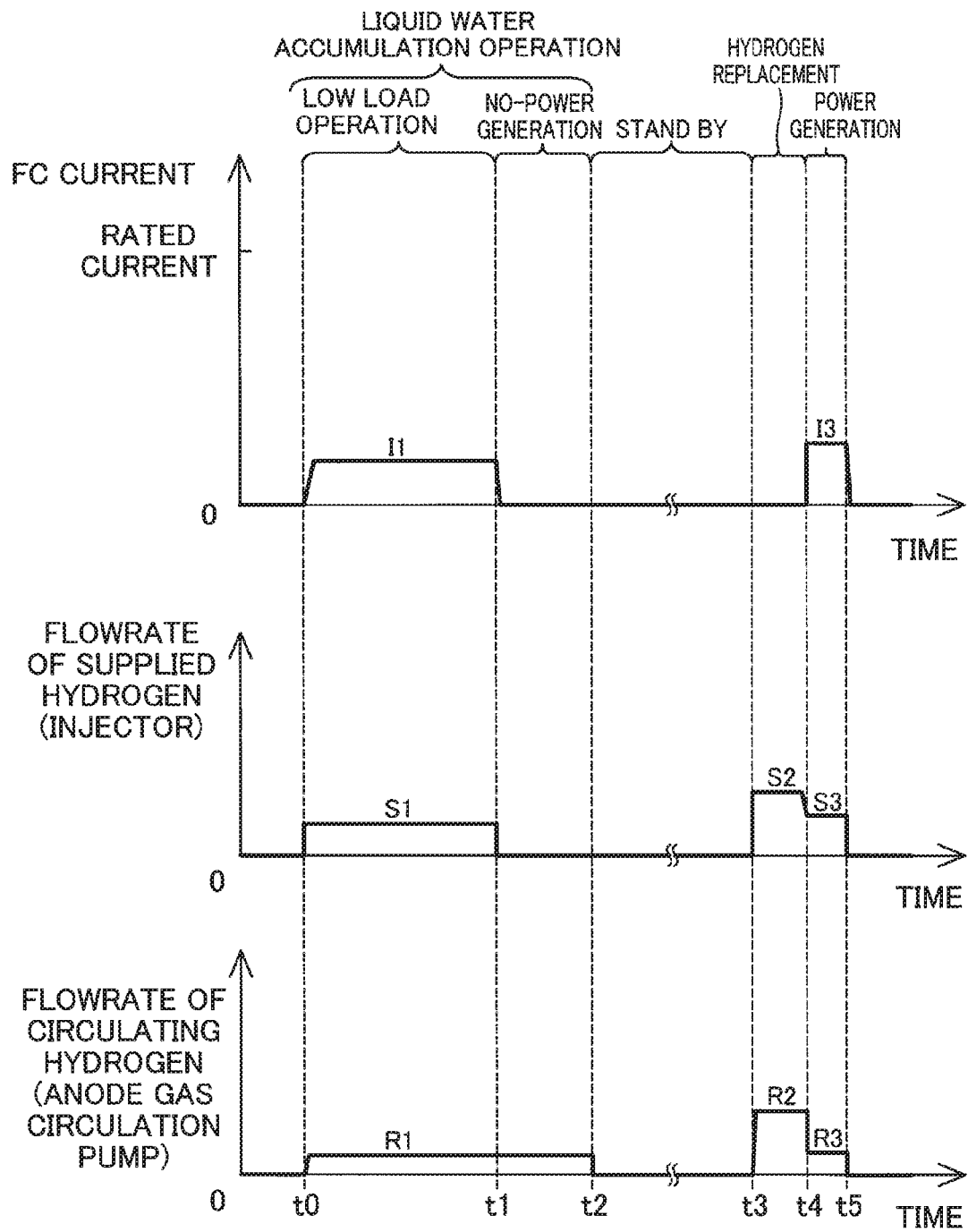
FIG. 5 is a diagram illustrating an example how current generated by the fuel cell stack, a flowrate of supplied hydrogen, and a flowrate of circulating hydrogen change over time, during an inspection process for the fuel cell stack.

FIG. 5 is a diagram illustrating an example how the current generated by the fuel cell stack 20, the flowrate of supplied hydrogen, and the flowrate of circulating hydrogen change over time, during the inspection process for the fuel cell stack 20. The fuel cell system 10 performs the low load operation (FIG. 4, step S322) in a period between a time point t0 and a time point t1. The operation is performed with the fuel cell stack 20 generating current I1 lower than the rated current. Thus, the injector 54 supplies hydrogen at a flowrate S1 and the anode gas circulation pump 55 circulates the hydrogen at a flowrate R1. The temperature of the fuel cell stack 20 reaches the warm-up completed temperature at the time point t1.

The fuel cell system 10 performs the non-power-generating operation (FIG. 4, step S326) in a period between the time point t1 and a time point t2. The operation is performed with no power generated by the fuel cell stack 20 and no hydrogen supplied by the injector 54, and with the anode gas circulation pump 55 still circulating the hydrogen at the flowrate R1. With the anode gas circulation pump 55 thus operating, the water vapor generated due to the low load operation flows into the anode gas circulation flow path 62 (FIG. 1) causing condensation resulting in the liquid water accumulated in the anode gas circulation flow path 62. The fuel cell system 10 stops operating at the time point t2.

The fuel cell system 10 stands by in a period between the time point t2 and a time point t3 (FIG. 3, step S410). In this state, no power is generated by the fuel cell system 10, and the injector 54 and the anode gas circulation pump 55 do not operate. The produced water, produced during the low load operation, moves to the anode side of the unit cell 24, whereby the liquid water is accumulated on the anode side.

The fuel cell system 10 performs the hydrogen replacement in a period between the time point t3 and a time point t4 (FIG. 3, step S520). In this state, no power is generated by the fuel cell stack 20, the injector 54 supplies the hydrogen at a flowrate S2, and the anode gas circulation pump 55 is circulates the hydrogen at a flowrate R2 (=S2). With the anode gas circulation pump 55 thus operating, the liquid water accumulated in the anode gas circulation flow path 62 and on the anode side of the unit cells 24 is supplied to the anode gas supply port 25 (FIG. 1) of the fuel cell stack 20.

The fuel cell stack 20 generates power (FIG. 3, step S530) in a period between the time point t4 and a time point t5. In this state, the fuel cell stack 20 generates current I3. Thus, the injector 54 supplies the hydrogen at a flowrate S3 and the anode gas circulation pump 55 circulates the hydrogen at a flowrate R3. At the time point t5, the negative voltage inspection time period elapses, and thus the fuel cell system 10 stops.

FIG. 6 is a diagram illustrating how the anode gas introducing flow path 111 of the unit cell 24 (FIG. 1) having the negative voltage is clogged by the liquid water. FIG. 6 illustrates, as an example, an area VI in a dotted line circle in FIG. 2. A protrusion 112 is formed between each adjacent ones of the unit introducing flow paths 111p of the anode gas introducing flow path 111. Each protrusion 112 is divided into two with a gap 111m thinner than the unit introducing flow path 111p.

As illustrated in FIG. 6, in the unit cell 24 that is likely to have the anode gas introducing flow path 111 clogged, when liquid water Wa accumulated through steps S310 to S520 in FIG. 3 flows into the anode gas introducing flow path 111 through the anode gas inlet manifold hole 110 of the separator 100 from the anode gas supply port 25 of the fuel cell stack 20, the unit introducing flow paths 111p suck up the liquid water Wa due to the gap 111m resulting in the anode gas introducing flow path 111 being clogged. When the power is generated with the anode gas introducing flow path 111 clogged, the unit cell 24 falls into a hydrogen shortage state to have negative voltage. Thus, the unit cell 24 whose anode gas introducing flow path 111 is likely to be clogged will be detected by detecting the unit cell 24 having the negative voltage.

As described above, in one embodiment of the present disclosure, it is possible to detect the unit cell 24 whose anode gas introducing flow path 111 is likely to be clogged by detecting a unit cell 24 having negative voltage in the inspection process for the fuel cell stack 20.

What is claimed is:

1. An inspection method for a fuel cell stack including a plurality of unit cells, the method comprising the steps of:
   (a) operating a fuel cell system, including the fuel cell stack and an anode gas circulation flow path that is disposed outside of the fuel cell stack and that is connected between an anode gas discharge port and an anode gas supply port of the fuel cell stack to circulate anode gas, in a liquid water accumulation state to accumulate liquid water in the anode gas circulation flow path, wherein the operation in the liquid water accumulation state includes:
      a low load operation in which the fuel cell system is operated with the fuel cell stack generating an electric current lower than a rated current of the fuel cell stack, and
      a non-power-generating operation, performed after the low load operation, in which power generation by the fuel cell stack is stopped and the fuel cell system operates with circulation of the anode gas continuing in the anode gas circulation flow path;
   (b) causing, after the step (a), the fuel cell system to stop operating and stand by; and
   (c) restarting, after the step (b), the fuel cell system to implement the power generation by the fuel cell stack, and measuring voltage of each of the unit cells to detect a unit cell having negative voltage.

2. The inspection method for a fuel cell stack according to claim 1,
   wherein the low load operation is performed in such a manner that a temperature of the fuel cell stack rises to a predetermined warm-up completed temperature within a temperature range from 55° C. to 60° C. due to the low load operation while a temperature of an anode gas circulation pump provided on the anode gas circulation flow path does not reach the warm-up completed temperature.

3. The inspection method for a fuel cell stack according to claim 1, wherein the fuel cell system is caused to stand by in the step (b) until:
   a predetermined stand by period elapses after the fuel cell system has stopped, or
   the temperature of the fuel cell stack drops to a predetermined stand by completion temperature within a temperature range from 30° C. to 40° C.

4. The inspection method for a fuel cell stack according to claim 1,
   wherein the step (a) is executed to accumulate liquid water in an anode gas circulation pump provided on the anode gas circulation flow path.

5. The inspection method for a fuel cell stack according to claim 1,
   wherein the step (c) includes supplying anode gas to the fuel cell stack, before the power generation by the fuel cell stack begins, to replace gas remaining on an anode side of the unit cells with the anode gas.

* * * * *